United States Patent [19]

House et al.

[11] 4,427,556

[45] * Jan. 24, 1984

[54] DISPERSIBLE HYDROPHILIC POLYMER COMPOSITIONS

[75] Inventors: Roy F. House, Houston; Lonnie D. Hoover, Chappell Hill, both of Tex.

[73] Assignee: NL Industries, Inc., New York, N.Y.

[ * ] Notice: The portion of the term of this patent subsequent to May 18, 1999 has been disclaimed.

[21] Appl. No.: 196,367

[22] Filed: Oct. 14, 1980

[51] Int. Cl.$^3$ .......................... C09K 7/02; E21B 43/00
[52] U.S. Cl. ........................... 252/8.5 A; 71/DIG. 1; 252/8.5 C; 252/8.55 R; 252/363.5
[58] Field of Search ........... 252/8.5 A, 8.5 C, 8.55 R, 252/363.5; 536/87, 88; 106/189, 191, 208

[56] References Cited

U.S. PATENT DOCUMENTS

| | | | |
|---|---|---|---|
| 2,970,063 | 1/1961 | Jordan et al. | 536/87 X |
| 3,122,203 | 2/1964 | Hawkins | 252/8.55 X |
| 4,003,838 | 1/1977 | Jackson et al. | 252/8.5 |
| 4,046,197 | 9/1977 | Gruesbeck et al. | 252/8.5 X |
| 4,304,677 | 12/1981 | Stauffer et al. | 252/8.55 |
| 4,330,414 | 5/1982 | Hoover | 252/8.5 |

FOREIGN PATENT DOCUMENTS

| | | | |
|---|---|---|---|
| 926532 | 5/1973 | Canada | 252/363.5 |
| 2000799 | 1/1979 | United Kingdom | 252/363.5 |

OTHER PUBLICATIONS

"K8D30—A Fine-Mesh Biopolymer for Liquid Viscosifiers" Published by Kelco, Division of Merck & Co., Inc. 4-1979.

Primary Examiner—Herbert B. Guynn
Attorney, Agent, or Firm—Browning, Bushman, Zamecki & Anderson

[57] ABSTRACT

A polymer composition for use in aqueous mediums comprising a hydrophilic polymer, a water miscible polar organic liquid which acts as a solvating agent for the hydrophilic polymer, the solvating agent being of a type which forms a semi-solid to viscous mixture with the hydrophilic polymer under certain conditions, and a diluting agent which is a non-solvating agent for the hydrophilic polymer. The polymer compositions can be added to aqueous mediums, particularly heavy brines, to produce well servicing fluids.

23 Claims, No Drawings

DISPERSIBLE HYDROPHILIC POLYMER COMPOSITIONS

BACKGROUND OF THE INVENTION

The present invention relates to compositions for use as thickening agents in aqueous systems and to aqueous well servicing fluids prepared therefrom.

Thickened aqueous mediums, particularly those containing oil field brines, are commonly used as well servicing fluids such as drilling fluids, workover fluids, completion fluids, packer fluids, well treating fluids, subterranean formation treating fluids, spacer fluids, hole abandonment fluids, and other aqueous fluids in which an increase in viscosity is desired. It is known to use hydrophilic polymeric materials as thickening agents for aqueous mediums used in such well servicing fluids. However, many hydrophilic polymers are not readily hydrated, solvated or dispersed in aqueous systems without elevated temperatures and/or mixing under high shear for extended periods of time. For example, many such polymers are poorly hydrated, solvated or dispersed in aqueous solutions containing one or more multivalent cation water soluble salts, such as heavy brines which are commonly used in well servicing fluids. In many cases, as for example in workover operations, the equipment available for preparing the well servicing fluids does not readily lend itself to high temperature, high shear mixing. Accordingly, it is usually necessary, if it is desired to use such thickened brines to prepare them off the well site.

SUMMARY OF THE INVENTION

It is, therefore, an object of the present invention to provide new, polymeric compositions useful for thickening aqueous mediums, especially heavy brines having a density greater than 11.0 pounds per gallon.

Another object of the present invention is to provide new, polymeric compositions which exhibit enhanced fluid loss control in heavy brine solutions.

A further object of the present invention is to provide an improved, aqueous well servicing fluid.

Still another object of the present invention is to provide a liquid polymeric composition which is pourable and pumpable, easily handled and which can be used to form thickened aqueous well servicing fluids under conditions of low shear mixing.

The above and other objects of the present invention will become apparent from the description given herein and the appended claims.

In accordance with the present invention, there is provided, in one embodiment, a polymeric composition comprising a particulate, organic polymer which is water soluble or water dispersible and upon solubilization or dispersion in an aqueous medium increases the viscosity or decreases the fluid loss, a solvating agent, and a diluting agent which is a non-solvating agent for the polymer. The solvating agent is a water miscible, polar organic liquid which when uniformly mixed, as by spatulating, with the polymer in a weight ratio of polymer to solvating agent of 1:2 will produce a viscous to semi-solid mixture with no free liquid (solvating agent) present after the mixture sets for approximately one week, at ambient temperature, in a sealed container. Preferably, there is also included a compatibilizing agent which has the capability of gelling the diluting agent.

In still a further embodiment of the present invention, the polymeric compositions described above can be admixed with an aqueous medium such as, for example, a heavy brine to produce well servicing fluids, e.g. a workover fluid.

DESCRIPTION OF THE PREFERRED EMBODIMENTS

The polymeric compositions of the present invention utilize, as the hydrophilic polymer, any particulate, organic polymer which is water soluble or water dispersible and, which upon solubilization or dispersion in an aqueous medium, will increase the viscosity, and which normally form agglomerates or lumps upon addition to an aqueous system or slowly hydrate, solvate or disperse in an aqueous system. Preferably, the hydrophilic polymer is selected from the group consisting of cellulose derivatives, water dispersible starch derivatives, polysaccharide gums and mixtures thereof. Exemplary cellulose derivatives are the carboxyalkyl cellulose ethers such as carboxymethyl cellulose and carboxyethyl cellulose; hydroxyalkyl cellulose ethers such as hydroxyethyl cellulose and hydroxypropyl cellulose; and mixed cellulose ethers such as: carboxyalkyl hydroxyalkyl cellulose, e.g. carboxymethyl hydroxyethyl cellulose; alkylhydroxyalkyl cellulose, e.g. methyl hydroxyethyl cellulose, methyl hydroxypropyl cellulose; alkylcarboxyalkyl cellulose, e.g. ethylcarboxymethyl cellulose. See U.S. Pat. No. 4,110,230 incorporated herein by reference. Exemplary starch derivatives are the carboxyalkyl starch ethers such as carboxymethyl starch and carboxyethyl starch; hydroxyalkyl starch ethers, such as hydroxyethyl starch and hydroxypropyl starch; and mixed starch ethers such as: carboxyalkyl hydroxyalkyl starch, e.g. carboxymethyl hydroxyethyl starch; alkyl hydroxyalkyl starch, e.g. methyl hydroxyethyl starch; alkyl carboxyalkyl starch, e.g. ethyl carboxymethyl starch. Exemplary polysaccharide gums include: the bipolymers such as xanthomonas (xanthan) gum; galactomannan gums, such as guar gum, locust bean gum, tara gum; glucomannan gums; and derivatives thereof, particularly the hydroxyalkyl derivatives. For other exemplary polysaccharide gums see U.S. Pat. Nos. 4,021,355 and 4,105,461, incorporated herein by reference. Especially preferred hydrophilic polymers are xanthan gum (XC polymer), carboxymethyl cellulose and hydroxyethyl starch.

Usually, upon the addition of dry, powdered hydrophilic polymers to water, the polymer particles undergo hydration preventing the interior of the particle from readily hydrating, solvating or otherwise dispersing in the aqueous medium. Accordingly, high shear, long mixing times and/or elevated temperatures must be applied in order to obtain a homogeneous system. It is a feature of the present invention that the polymeric compositions of the present invention readily hydrate, dissolve or disperse in aqueous mediums at relatively low shear and ambient temperature. The thickening agents or polymeric compositions herein are liquids, pumpable and pourable.

In addition to the polymer, there is present in the compositions a solvating agent. Generally speaking, the solvating agent comprises a water miscible, polar organic liquid which exhibits a swelling effect on the polymer. Many compounds can be utilized as solvating agents depending upon the end use of the thickening agent. In determining whether a particular compound or material will function as a solvating agent according to the present invention, a simple test can be utilized as follows: one (1) part by weight of the hydrophilic polymer is uniformly mixed, as by spatulating, with two (2) parts by weight of the candidate solvating agent. The mixture is then allowed to set, in quiescent state, for one week at ambient temperature in a container, preferably sealed. Liquids which are useful as solvating agents when subjected to the test procedure produce solid, semi-solid or viscous mixtures with no free liquid present in the mixture after the one week solvating period. Generally speaking, it has been found that virtually any organic compound which passes the solvation test described above will function, to a usable degree, as a solvating agent. Non-limiting but preferred solvating agents include: aliphatic glycols containing from 2 to 5 carbon atoms such as ethylene glycol, 1,2-propanediol, 1,4-butanediol, 1,3-pentanediol and the like; alkylene triols containing from 2 to 6 carbon atoms such as glycerol, 1,2,3-butane-triol, 1,2,3-pentanetriol, and the like; lower molecular weight polyalkylene glycols containing 4 to 9 atoms, such as diethylene glycol, triethylene glycol, and the like; amides containing from 1 to 4 carbon atoms such as formamide, acetamide, dimethyl formamide, and the like; and the mixtures of the various above compounds. Generally speaking, the solvating agent, depending on its ability to swell the polymer, will be present in the compositions, in a weight ratio of solvating agent to polymer of about 1:1 to about 5:1, preferably in the range from about 2:1 to about 4:1.

The diluting agent, in general, will be any liquid organic compound or material which is not a solvating agent. In general, the diluting agents are liquids which do not appreciably swell the polymers, i.e. they do not produce semisolid or viscous mixtures which have no free liquid present after the one week solvation period described in the above test for determining solvating agents. Non-limiting examples of diluting agents include liquid aliphatic and aromatic hydrocarbons containing from 5 to 10 carbon atoms, kerosene, diesel oil, isopropanol, certain alkylene glycol ethers, vegetable oils, etc. Particularly preferred are organic liquids which are water soluble or miscible most preferably alkanols having at least 3 carbon atoms, ethylene glycol monoalkyl ethers, dialkylene glycol monoalkyl ethers, and the like. The diluting agent will preferably be present in an amount which wil maintain the polymeric composition in a liquid, pourable state at a temperature of about 20° C. It will be understood, however, that lesser amounts of diluting agent can be used if desired and that the ultimate amount of diluting agent employed will depend upon the type of shear which is available to disperse the thickener. In general, it has been found that desirable thickeners, which are pourable liquids, can be produced from compositions containing from about 10 to about 25% by weight hydrophilic polymer, from about 2 to about 70% by weight diluting agent, and from about 5 to about 88% solvating agent.

It is preferable that a compatibilizing agent also be used. The compatibilizing agent will be a material which will disperse in the diluting agent, increase the viscosity of the diluting agent, reduce synersis and, in general, aid in providing a homogeneous combination of the polymer, the solvating agent and the diluting agent.

Non-limiting examples of compatibilizing agents include organophilic hectorites, organophilic attapulgites, organophilic bentonites and the like. Such organophilic clays are produced by methods and have a composition described in U.S. Pat. Nos. 2,966,506 and 4,105,578, both of which are herein incorporated by reference for all purposes. In addition, the compatibilizing agent can include finely divided siliceous materials such as fumed silica, surface treated silicas such as silane treated silicas, etc. Particularly preferred compatibilizing agents are the organophilic clays described in U.S. Pat. No. 4,105,578, incorporated herein for all purposes. Such clays are formed by the reaction of a methylbenzyl dialkyl ammonium compound, wherein the ammonium compound contains 20 to 25% alkyl groups having 16 carbon atoms and 60 to 75% alkyl groups having 18 carbon atoms, and a smectite-clay having a cationic exchange capacity of at least 75 milliequivalents per hundred grams of said clay, and wherein the amount of said ammonium compound is from about 100 to about 120 milliequivalents per hundred grams of said clay, 100% active clay basis. Non-limiting examples of such preferred organophilic clays include dimethyl dialkyl ammonium bentonite, dimethyl benzyl alkyl ammonium bentonite, methyl benzyl dialkyl ammonium bentonite, and mixtures thereof, wherein the alkyl group contains at least 12 carbon atoms, preferably 16 to 18 carbon atoms, and most preferably wherein the alkyl group is derived from hydrogenated tallow. An especially preferred organophilic clay is methyl benzyl dihydrogenated tallow ammonium bentonite.

When an organophilic clay is used as the compatibilizing agent, it is preferable to use a dispersant to enhance the dispersability of the organophilic clay in the diluting agent. Generally speaking, the dispersant is a low molecular weight, polar organic compound such as a lower molecular weight alcohol, a lower ketone, a lower alkylene carbonate and the like. Preferred are aliphatic alcohols having from 1 to 2 carbon atoms, ketones having from 2 to 5 carbon atoms, and mixtures thereof. Mixtures of such polar organic compounds and water can be used as well as water itself, the latter if sufficient shear is utilized to disperse the compatibilizing agent. A preferred dispersant comprises a methanol-water mixture containing from about 75 to about 98% by weight methanol and from about 25 to about 2% by weight water. Advantageously, the dispersant may comprise one of the solvating agents mentioned above. Thus, for example, a part of the solvating agent can be used to disperse the compatibilizing agent into the diluting agent. It will be understood that the dispersant, while desirable, is optional since its function is to aid in forming a homogeneous suspension of the organophilic clay, i.e. the compatibilizing agent, in the diluting agent. Such a homogeneous suspension can be achieved by mixing techniques well known in the art. When employed, the dispersant will be present in an amount of from about 1.5 to about 80% by weight, based on the weight of the compatibilizing agent, preferably from about 20 to about 40% by weight, based on the weight of the compatibilizing agent.

The compatibilizing agent need only be present in the composition in an amount sufficient to keep the blend of the polymer, the solvating agent and all or a part of the diluting agent from solidifying. Preferably, the compatibilizing agent will be present in an amount, based on the amount of diluting agent plus compatibilizing agent, of from about 1 to about 25 pounds per 42 gallon barrel (ppb), most preferably from about 5 to about 15 ppb.

While the polymeric compositions of the present invention are useful as thickeners or suspending agents in suspension fertilizers, liquid pesticides, liquid herbicides, and other aqueous systems which require viscosity enhancement, they are particularly useful in the preparation of well servicing fluids and, more particularly, well servicing fluids made from aqueous mediums containing soluble salts such as, for example, a soluble salt of an alkali metal, an alkaline earth metal, a Group Ib metal, a Group IIb metal, as well as water soluble salts of ammonia and other cations. The thickener compositions are particularly useful in the preparation of thickened heavy brines, i.e. aqueous solutions of soluble salts of multivalent cations, e.g. Zn and Ca.

The most preferred thickened heavy brines, particularly those used for well servicing fluids, are made from brines having a density greater than about 11.0 pounds per gallon (ppg). Especially preferred heavy brines comprise water solutions of salts selected from the group consisting of calcium chloride, calcium bromide, zinc chloride, zinc bromide, and mixtures thereof.

The use of a solid, particulate inert filler in the compositions of the present invention aids in dispersibility and increases the rate of hydration of the polymer compositions in heavy brine solutions. Accordingly, the desired rheology is obtained at a faster rate when the polymer solutions are added to such brines. The filler should be a material which exhibits little or no absorption capacity for the solvating agent and is, in general, non-reactive with the hydrophilic polymer, solvating agent or the diluting agent. Non-limiting examples of such solid, particulate, inert fillers include kaolin, alumina, silica, diatomauous earth, oil soluble resins, alkaline earth metal carbonates, alkali metal carbonates, etc. When employed, the inert filler will be present in a weight raio of polymer to filler of from about 1:1 to about 1:10.

It has been found that if the polymer compositions or thickeners are aged before being added to heavy brines, the hydration rate in such brines is increased. Accordingly, although the polymer compositions or thickeners may be added to the heavy brines within several hours of their preparation, longer aging times increase the rate at which the thickeners hydrate in the heavy brines.

To more fully illustrate the present invention, the following non-limiting examples are presented. Unless otherwise indicated, all physical property measurements were made in accordance with testing procedures set forth in STANDARD PROCEDURE FOR TESTING DRILLING FLUID API RP 13B, Seventh Edition, April, 1978. The physical property parameters referred to in the examples, unless otherwise indicated, are in units expressed as follows:

300 rpm = Fann V-G Meter dial reading at 300 rpm
PV = API Plastic Viscosity (cps)
YP = API Yield Point (lb/100 sq. ft.)
GELS = 10-sec gel/10 min. gel where 10-sec gel = API 10-sec gel strength (lb/100 sq. ft.), 10-min. gel = API 10-min. gel strength (lb/100 sq. ft.)

EXAMPLE 1

Polymer compositions were prepared by the following procedure:

(1) A stock mixture of diesel oil and methyl benzyl dihydrogenated tallow ammonium bentonite was prepared by mixing together with a Premier Dispensator for 20 minutes, 8,000 parts by weight diesel oil, 160 parts by weight GELTONE II (Tradename of an organophilic bentonite marketed by NL Baroid, Houston, Tex.) and 45.5 parts by weight of a 95/5 (weight ratio) mixture of methanol and water, the latter mixture functioning as a dispersion aid for the organophilic clay;

(2) To 200 gm. of this stock diesel mixture were added 100 gm. of XC polymer while mixing with a Multimixer, and the mixing was continued for 2 minutes;

(3) 100 gm. of a potential solvating agent were added and the mixing was continued for 5 minutes;

(4) Thereafter the polymer compositions were allowed to set for at least 16 hours before being evaluated. The polymer compositions were evaluated in a 19.2 pounds per gallon (ppg) brine solution containing calcium bromide and zinc bromide at a thickener concentration of 12 pounds per barrel (ppb) (3 ppb XC polymer) by the following procedure:

(1) 350 ml. of the brine and 4 gm. of the polymer composition (thickener) were mixed together for 5 minutes with a Multimixer;
(2) The rheological properties were measured;
(3) The samples were placed in pint jars in a roller oven at a temperature of 150° F. and rolled overnight;
(4) The rheological properties were obtained after the samples had cooled to room temperature. The data obtained are given in Table I below.

For comparison purposes, polymeric compositions were prepared in which the stock diesel mixture was substituted for the solvating agent (designated NONE). Also, the dry powdered unsolvated XC polymer was evaluated in the $CaBr_2/ZnBr_2$ brine. As can be seen from the data in Table 1, numerous compounds function as solvating agents. Additionally, it can be seen that without a solvating agents the hydration rate is greatly reduced as evidenced by poor rheological properties.

TABLE 1

| | 3 ppb XC Polymer in 19.2 $CaBr_2/ZNBr_2$ Solution | | | | | | | |
|---|---|---|---|---|---|---|---|---|
| | Initial Rheology* | | | | Final Rheology** | | | |
| Solvating Agent | 300 | PV | YP | GELS | 300 | PV | YP | GELS |
| None | 23 | 17 | 6 | 1/3 | 104 | 51 | 53 | 3/3 |
| Ethylene Glycol | 35 | 32 | 3 | 1/1 | 103 | 69 | 34 | 2/2 |
| Diethylene Glycol | 43 | 38 | 5 | 1/1 | 169 | 94 | 75 | 6/6 |
| Triethylene Glycol | 27 | 27 | 0 | 1/1 | 151 | 89 | 62 | 4/4 |
| 1,3-Propane diol | 26 | 18 | 8 | 1/1 | 148 | 58 | 90 | 5/5 |
| Glycerin | 28 | 28 | 0 | 1/1 | 157 | 92 | 65 | 3/4 |
| None-Dry Powder XC Polymer | 20 | 13 | 7 | 1/- | 76 | 48 | 28 | 2/2 |

*After 5 minutes on a Multimixer
**After rolling overnight @ 150° F.

EXAMPLE 2

Polymer compositions were prepared using the following procedure:

(1) 200 gm. of diesel oil, 7 gm. of GELTONE® II organophilic clay, and 2.4 ml. of the 95/5 mixture of methanol and water were mixed on a Multimixer for 15 minutes;
(2) 100 gm. of the polymer indicated in Table 2 were added and mixed 2 minutes;
(3) 100 gm. of the solvation aids indicated in Table 2 were added and mixed 2 minutes;
(4) Thereafter the polymer compositions were allowed to set for one hour before being evaluated.

The polymer compositions were evaluated at a concentration of 8 ppb (2 ppb polymer) in the 19.2 ppg $CaBr_2/ZnBr_2$ brine. The API rheology was obtained after mixing 15 minutes on a Multimixer and after the samples were rolled for 16 hours at 150° F. The data obtained are given in Table 2.

TABLE 2

| Polymer | Solvation Aid* | Initial Rheology | | | Final Rheology | | |
|---|---|---|---|---|---|---|---|
| | | PV | YP | 10 Sec. Gel | PV | YP | 10 Sec. Gel |
| CELLEX[1] CMC | 70% EG, 30% NVP | 20 | 2 | 2 | 32 | 0 | 2 |
| CELLEX CMC | EG | 20 | 1 | 2 | 25 | 3 | 2 |
| XC Polymer | 70% EG, 30% NVP | 23 | 2 | 2 | 59 | 43 | 5 |
| XC Polymer | EG | 22 | 3 | 2 | 57 | 37 | 4 |

[1]Tradename of a sodium carboxymethyl cellulose (CMC) marketed by NL Baroid, Houston, Texas
*EG = Ethylene Glycol; NVP = N—Vinyl Pyrroliodone; % by weight

EXAMPLE 3

Polymer compositions were prepared using the procedure of Example 1. The polymer compositions were evaluated in an 11.6 ppg calcium chloride brine solution at the concentrations listed in Table 3. The samples were prepared as in Example 1. After the rheological properties were obtained on the samples rolled at 150° F., 10 ppb of BARACARB (Tradename of a calcium carbonate bridging agent marketed by NL Baroid, Houston, Tex.) were added and mixed 2 minutes on a Multimixer. The API RB13B low temperature filtration test was then conducted on each sample. For comparison, the dry powder polymers were evaluated at the same concentration. The data obtained are given in Table 3.

Sample A

An XC polymer composition was prepared by mixing together 20% by weight XC polymer, 25% glycerol, 54.6% isopropanol, and 0.4% CAB-O-SIL M5 (fumed silica) and aging 16 hours.

Sample B

The BOHRAMYL CR composition was prepared by mixing together 20% by weight BOHRAMYL CR, 25% glycerol, 54.6% isopropanol, and 0.4% CAB-O-SIL M5 and aging for 16 hours.

Samples A and B were evaluated at a concentration of 15 ppb (3 ppb XC polymer or BOHRAMYL CR) in a 16 ppg $CaBr_2/ZnBr_2$ solution. The solutions were stirred with a Fann V-G meter at 300 rpm for 1 hour and the dial reading was obtained initially and after 30 and 60 minutes. The solutions were rolled overnight at 150° F., cooled to room temperature and again evaluated. Thereafter, 10 ppb of BARACARB were added to each solution and the API filtration test conducted on each. As can be seen from the data obtained and given in Table 4, both the XC polymer and the BOHRAMYL CR act as good filtrate control agents in the presence of a calcium carbonate bridging agent after hot rolling.

TABLE 4

| | 3 ppb Additive in 16.0 ppg Solution | | | | |
|---|---|---|---|---|---|
| | 300 rpm Fann V-G Dial Reading | | | | API Filtrate ml. |
| | Minutes at 300 rpm | | | After Rolling | |
| Sample | 0 | 30 | 60 | | |
| A | 19 | 24 | 26 | 91 | 28 |
| B | 12 | 13 | 15 | 23 | 10.8 |

TABLE 3

| Polymer | Polymer Comp. ppb | Polymer ppb | Initial Rheology | | | | Final Rheology | | | | API Fluid Loss ml. |
|---|---|---|---|---|---|---|---|---|---|---|---|
| | | | 300 | PV | YP | Gels | 300 | PV | YP | Gels | |
| CELLEX | 20 | 5 | * | * | * | * | * | * | * | * | 18.6 |
| (Carboxymethyl Cellulose) | — | 5 | * | * | * | * | * | * | * | * | 34 |
| XC Polymer | 12 | 3 | 20 | 14 | 6 | 1/- | 74 | 29 | 45 | 16/22 | 1.6 |
| (Xanthomonas Biopolymer) | — | 3 | 8 | 8 | 0 | 1/1 | 69 | 24 | 45 | 15/24 | 2.2 |
| LOLOSS[1] | 12 | 3 | 171 | 57 | 114 | 21/1 | 190 | 54 | 136 | 26/26 | 2.9 |
| (Guar Gum) | — | 3 | 133 | 63 | 70 | 14/- | 191 | 53 | 138 | 24/24 | 23.5 |
| Hydroxypropyl Starch | 20 | 5 | 21 | 19 | 2 | 0/- | 18 | 16 | 2 | 1/1 | 5.4 |
| Hydroxypropyl Starch | — | 5 | 10 | 10 | 0 | 0/- | 14 | 12 | 2 | 2/2 | 86 |
| DEXTRID[2] | 20 | 5 | 38 | 22 | 16 | 1/- | 19 | 16 | 3 | 1/3 | 60 |
| (Modified Starch) | — | 5 | * | * | * | * | * | * | * | * | 28.4 |

*No dispersion of polymer
[1]Tradename of a guar gum marketed by NL Baroid/NL Industries, Inc.
[2]Tradename of a modified starch marketed by NL Baroid/NL Industries, Inc.

EXAMPLE 4

The following example demonstrates the solvation of XC polymer and BOHRAMYL CR (Tradename of a non-ionic hydroxyethyl starch marketed by Avebe, Veendam, Holland) and their use as fluid loss control additives in heavy brines.

In the following examples, brine systems in which the polymeric suspensions were tested were as follows:

| 11.6 ppg | $CaCl_2$ |
| 14.2 ppg | $CaBr_2$ |

-continued

| | |
|---|---|
| 15.0 ppg | CaCl$_2$/CaBr$_2$ |
| 15.2 ppg | CaCl$_2$/CaBr$_2$/ZnBr$_2$ |
| 15.5 ppg | CaBr$_2$/ZnBr$_2$ |
| 16.0 ppg | CaBr$_2$/ZnBr$_2$ |
| 19.2 ppg | CaBr$_2$/ZnBr$_2$ |

EXAMPLE 5

Sample A

Suspensions of XC polymers were made in the following manner: 58.8% of isopropanol and 0.2% by weight of CAB-O-SIL were mixed on a Multimixer for 2 minutes. Following this, 20% by weight of the XC polymer was added and the mixing carried out for an additional minute. Twenty-two percent by weight of glycerol was then added and the mixing continued an additional 1 minute.

After standing overnight, the suspensions were tested at a concentration of 3 ppb XC polymer in brines of various densities. Rheology was taken on the Fann Model 35-A after rolling 1 hour at room temperature and again after rolling overnight at 150° F. The API filtrate was run after adding 10 ppb calcium carbonate bridging agent to each sample.

Sample B

The method used in preparing Sample A of Example 5 was carried out except the suspension contained 40% by weight isopropanol, 20% by weight XC polymer and 40% by weight glycerol.

Control samples in which dry powder was added directly to each brine at the 3 ppb level were also tested in the same manner. The results are given in Table 5.

TABLE 5

3 ppb XC Polymer in Brine Solution

| Solvating Agent | Brine Solution (ppg) | API Rheology | | | | | | API Fluid* Loss (ml) |
|---|---|---|---|---|---|---|---|---|
| | | One Hr. @ R.T. | | | 16 Hrs. @ 150° F. | | | |
| | | 600 | 300 | 3 | 600 | 300 | 3 | |
| NONE | 11.6 | 17 | 9 | 0.5 | 147 | 98 | 23 | 9.2 |
| 22% Glycerol | 11.6 | 22.5 | 12 | 1 | OS** | 125 | 17 | 4.0 |
| 40% Glycerol | 11.6 | 19 | 10 | 1 | OS | OS | — | 16.0 |
| NONE | 14.2 | 15 | 8 | 1 | 29 | 15 | 2 | 3.3 |
| 22% Glycerol | 14.2 | 24.5 | 12.5 | 1 | 72 | 45 | 25 | 0.5 |
| 40% Glycerol | 14.2 | 32.5 | 16 | 1 | 100 | 59 | 3 | 1.0 |
| NONE | 15.0 | 85 | 43 | 2 | 162 | 87.5 | 2 | 5.1 |
| 22% Glycerol | 15.0 | 90 | 46.5 | 1 | OS | 224 | 12 | 0 |
| 40% Glycerol | 15.0 | 119 | 61 | 2 | OS | OS | — | 0 |
| NONE | 15.2 | 70 | 36 | 2 | 123 | 65 | 2 | 8.9 |
| 22% Glycerol | 15.2 | 76 | 39 | 0.5 | OS | 216 | 10 | 0 |
| 40% Glycerol | 15.2 | 136 | 71 | 2 | 200 | 135 | 6 | 2.0 |
| NONE | 15.5 | 24 | 13 | 2 | 145 | 107 | 22 | 5.8 |
| 22% Glycerol | 15.5 | 59 | 33.5 | 2 | 99 | 65 | 3 | 3.9 |
| 40% Glycerol | 15.5 | 150 | 100 | 20 | 174 | 126 | 27 | 3.0 |
| NONE | 16.0 | 24 | 12 | 0 | 127 | 85 | 15 | 17 |
| 22% Glycerol | 16.0 | 58 | 30 | 1 | 136 | 93 | 7 | 3.8 |
| 40% Glycerol | 16.0 | 145 | 100 | 17 | 177 | 125 | 31 | 5.0 |
| NONE | 19.2 | 43 | 22 | 0.5 | 246 | 168 | 16 | 33 |
| 22% Glycerol | 19.2 | 84 | 45 | 2 | 231 | 152 | 9 | 19.4 |
| 40% Glycerol | 19.2 | 230 | 157 | 15 | 277 | 188 | 20 | 40 |

*10 ppb BARACARB CaCO$_3$ bridging agent added to hot rolled brine.
**Off Scale

As can be seen from the data in Table 5, activation of the XC polymer with the glycerol produced enhanced viscosities. Additionally, API fluid loss control was enhanced in the activated or solvated polymer as opposed to the unactivated polymer.

EXAMPLE 6

The procedure of Example 5, Sample A, was followed using DEXTRID (Tradename of a bacterially stabilized pre-gelatinized starch marketed by NL Baroid). The results are given in Table 6.

TABLE 6

3 ppb DEXTRID Polymer in Brine Solution

| Solvating Agent | Brine Solution (ppg) | API Rheology | | | | | | API Fluid* Loss (ml) |
|---|---|---|---|---|---|---|---|---|
| | | One Hr. @ 74° F. | | | 16 Hrs. @ 150° F. | | | |
| | | 600 | 300 | 3 | 600 | 300 | 3 | |
| NONE | 11.6 | 18 | 9 | 1 | 27 | 14 | 0.5 | 130 |
| Glycerol | 11.6 | 17 | 8.5 | 0.5 | 24 | 12 | 1 | 136 |
| NONE | 14.2 | 14 | 8 | 0.5 | 69 | 42 | 5 | 5.4 |
| Glycerol | 14.2 | 16 | 7 | 1 | 28 | 14 | 0.5 | 2.2 |
| NONE | 15.0 | 85 | 43 | 0.5 | 190 | 105 | 3 | 43 |
| Glycerol | 15.0 | 82 | 41 | 1 | 146 | 76 | 1 | 23 |
| NONE | 15.2 | 68 | 34 | 2 | 120 | 68 | 2 | 44 |
| Glycerol | 15.2 | 72 | 36 | 0.5 | 119 | 66 | 2.5 | 15 |
| NONE | 15.5 | 15 | 9 | 0.5 | 48 | 24 | 1 | 24 |
| Glycerol | 15.5 | 20 | 10 | 0.5 | 53 | 25 | 1 | 7.6 |
| NONE | 16.0 | 20 | 10 | 0.5 | 56 | 27 | 2 | 27 |
| Glycerol | 16.0 | 20 | 10 | 0.5 | 42 | 20 | 1 | 10 |
| NONE | 19.2 | 39 | 19 | 0.5 | 90 | 47.5 | 2 | 26 |
| Glycerol | 19.2 | 51 | 25 | 1 | 107 | 49 | 2 | 1.8 |

*10 ppb BARACARB CaCO$_3$ bridging agent added to hot rolled brine

EXAMPLE 7

The procedure of Example 5, Sample A, was followed using as a polymer IMPERMEX (Tradename of a pre-gelatinized starch marketed by NL Baroid). The results are given in Table 7.

TABLE 7

| | 3 ppb IMPERMEX Polymer in Brine Solution | | | | | | |
|---|---|---|---|---|---|---|---|
| | Brine | API Rheology | | | | | API Fluid* |
| Solvating | Solution | One Hr. @ 74° F. | | | 16 Hrs. @ 150° F. | | Loss |
| Agent | (ppg) | 600 | 300 | 3 | 600 | 300 | 3 | (ml) |
| NONE | 11.6 | 30 | 16 | 1 | 23 | 12 | 1 | 322 |
| Glycerol | 11.6 | 29.5 | 16 | 1 | 27.5 | 14.5 | 2 | 327 |
| NONE | 14.2 | 17 | 9 | 1 | 55 | 32 | 5 | 4.8 |
| Glycerol | 14.2 | 21 | 11 | 2 | 29 | 16 | 0.5 | 4.8 |
| NONE | 15.0 | 87 | 44 | 1 | 155 | 84 | 3 | 108 |
| Glycerol | 15.0 | 100 | 52.5 | 1 | 151 | 81 | 3 | 75 |
| NONE | 15.2 | 70 | 36 | 2 | 118 | 63 | 3 | NC** |
| Glycerol | 15.2 | 85 | 44 | 2 | 132.5 | 71 | 2 | 63 |
| NONE | 15.5 | 21 | 11 | 2 | 32 | 17 | 0.5 | 154 |
| Glycerol | 15.5 | 27 | 14 | 0.5 | 31 | 16 | 0.5 | 75 |
| NONE | 16.0 | 20 | 10 | 0.5 | 35 | 19 | 0.5 | 9.8 |
| Glycerol | 16.0 | 38 | 14 | 2 | 37 | 20 | 1 | 6.6 |
| NONE | 19.2 | 42 | 21 | 0.5 | 79 | 42 | 2 | NC |
| Glycerol | 19.2 | 59 | 30 | 1 | 84 | 45 | 3 | 2.2 |

*10 ppb BARACARB CaCO₃ bridging agent added to hot rolled brine
**NC = No Control

EXAMPLE 8

The procedure of Example 5, Sample A, was followed using CELLEX (Tradename of a sodium carboxymethyl cellulose (CMC) marketed by NL Baroid, Houston, Tex.). The results are given in Table 8.

TABLE 8

| | 3 ppb CELLEX Polymer in Brine Solution | | | | | | |
|---|---|---|---|---|---|---|---|
| | Brine | API Rheology | | | | | API Fluid* |
| Solvating | Solution | One Hr. @ 74° F. | | | 16 Hrs. @ 150° F. | | Loss |
| Agent | (ppg) | 600 | 300 | 3 | 600 | 300 | 3 | (ml) |
| NONE | 11.6 | 16 | 8 | 1 | 17 | 10 | 0.5 | 220 |
| Glycerol | 11.6 | 15 | 8 | 0.5 | 22 | 11 | 0.5 | 26.2 |
| NONE | 14.2 | 14 | 7 | 5 | 15 | 17 | 0.5 | 288 |
| Glycerol | 14.2 | 13.5 | 7 | 1 | 14 | 8 | 6 | 158 |
| NONE | 15.0 | 84 | 43 | 1 | 95 | 48 | 2 | 218 |
| Glycerol | 15.0 | 76.5 | 39 | 0.5 | 95 | 49 | 0.5 | 208 |
| NONE | 15.2 | 69 | 35 | 2 | 75 | 38 | 2 | NC** |
| Glycerol | 15.2 | 70 | 35 | 2 | 84 | 43 | 0.5 | 314 |
| NONE | 15.5 | 15 | 8 | 4 | 16 | 9 | 0.5 | 304 |
| Glycerol | 15.5 | 17 | 9 | 0.5 | 17.5 | 9 | 1 | 343 |
| NONE | 16.0 | 17 | 10 | 2 | 18 | 9 | 7 | 290 |
| Glycerol | 16.0 | 18 | 10 | 1 | 19 | 10 | 0.5 | 318 |
| NONE | 19.2 | 100 | 19 | 2 | 44 | 24 | 2 | NC |
| Glycerol | 19.2 | 42 | 21 | 1 | 90 | 49 | 2 | 35 |

*10 ppb BARACARB CaCO₃ bridging agent added to hot rolled brine
**NC = No Control

EXAMPLE 9

The procedure of Example 5 was followed using DRISPAC (Tradename of a polyanionic carboxymethyl cellulose marketed by NL Baroid). The results are given in Table 9.

TABLE 9

| | 3 ppb DRISPAC Polymer in Brine Solution | | | | | | |
|---|---|---|---|---|---|---|---|
| | Brine | API Rheology | | | | | API Fluid* |
| Solvating | Solution | One Hr. @ 74° F. | | | 16 Hrs. @ 150° F. | | Loss |
| Agent | (ppg) | 600 | 300 | 3 | 600 | 300 | 3 | (ml) |
| NONE | 11.6 | 16 | 9 | 1 | 21 | 11 | 2 | 44 |
| Glycerol | 11.6 | 17 | 9 | 1 | 33 | 17 | 1 | 5.5 |
| NONE | 14.2 | 15 | 8 | 1 | 15 | 8 | 0.5 | 296 |
| Glycerol | 14.2 | 14.5 | 8 | 1 | 16 | 9 | 0.5 | 288 |
| NONE | 15.0 | 85 | 43 | 2 | 101 | 52 | 2 | 126 |
| Glycerol | 15.0 | 83 | 42.5 | 1 | 214 | 118 | 3 | 1.1 |
| NONE | 15.2 | 70 | 36 | 2 | 75 | 38 | 2 | NC** |
| Glycerol | 15.2 | 74 | 38 | 2 | 91 | 46 | 3 | 212 |
| NONE | 15.5 | 16 | 8 | 0.5 | 17 | 9 | 0.5 | 298 |
| Glycerol | 15.5 | 18 | 9 | 2 | 16 | 8 | 0.5 | 336 |
| NONE | 16.0 | 17 | 9 | 0 | 17 | 9 | 0.5 | 280 |
| Glycerol | 16.0 | 20 | 10 | 0.5 | 20 | 10 | 0.5 | 312 |
| NONE | 19.2 | 39 | 20 | 0.5 | 50 | 26 | 2 | NC |

TABLE 9-continued

| | 3 ppb DRISPAC Polymer in Brine Solution | | | | | | |
|---|---|---|---|---|---|---|---|
| | Brine | API Rheology | | | | | API Fluid* |
| Solvating | Solution | One Hr. @ 74° F. | | | 16 Hrs. @ 150° F. | | Loss |
| Agent | (ppg) | 600 | 300 | 3 | 600 | 300 | 3 | (ml) |
| Glycerol | 19.2 | 45 | 23 | 2 | 258 | 166 | 11 | 0.4 |

*10 ppb BARACARB CaCO$_3$ bridging agent added to hot rolled brine
**NC = No Charge

EXAMPLE 10

Polymeric suspensions of BOHRAMYL CR crosslinked hydroxyethyl starch were made according to the following method:

1. 57.8% by weight of a diluting agent comprised of either isopropanol (IPA) or ethylene glycol monobutylether (Butyl Cellosolve) were admixed on a Multimixer for 1 minute with 0.2 weight percent of CAB-O-SIL. Twenty percent by weight of BOHRAMYL CR was then added and the mixing continued for an additional minute. Glycerol, in an amount of 22% by weight, was then added and an additional 1 minute of mixing carried out. The samples were allowed to stand overnight after which they were tested at 3 ppb active polymer basis in brines of various densities. Rheology data was obtained on a Fann Model 35-A after rolling 1 hour at room temperature and again after rolling overnight at 150° F. API filtrates were run after the addition of 10 ppb CaCO$_3$ bridging agents. Control samples in which 3 ppb dry powdered BOHRAMYL CR was added to each brine were tested in the same manner. The data are given in Table 10.

(Tradename of a hydroxypropyl cellulose marketed by Hercules, Inc. The XC and CMS polymer suspensions were mixed with a 16.0 ppg CaBr$_2$/ZnBr$_2$ solution for 10 minutes on a Multimixer. The concentration of the XC and CMS polymers in the brine solution were 4 ppb and 7.1 ppb, respectively. The sample was divided into two equal portions and 5 ppb of CaCO$_3$ were added to one sample. The samples were allowed to hydrate overnight at room temperature, and the API properties determined after rolling overnight at 150° C. The data obtained are given in Table 11.

TABLE 11

| | Sample | |
|---|---|---|
| | 1 | 2 |
| XC Polymer, ppb | 1 | 1 |
| Carboxymethyl Starch, ppb | 2 | 2 |
| Calcium Carbonate, ppb | 0 | 5 |
| Initial Properties After 15 Minutes on a Multimixer | | |
| Apparent Viscosity | 14 | 15 |
| Plastic Viscosity | 12.5 | 13.5 |
| Yield Point | 3.5 | 3.0 |
| 10 Sec. Gel Strength | 0.5 | 0.5 |
| Properties After Hydrating Overnight at 74° F. | | |
| Apparent Viscosity | 26 | 28 |
| Plastic Viscosity | 19 | 21 |
| Yield Point | 14.5 | 14.5 |
| 10 Sec. Gel Strength | 1 | 1 |
| API Filtrate | 14 | 3.6 |
| Properties After Rolling Overnight at 150° F. | | |
| Apparent Viscosity | 26 | 23 |
| Plastic Viscosity | 19.5 | 21 |
| Yield Point | 14 | 14.5 |
| 10 Sec. Gel Strength | 1 | 1 |

TABLE 10

| | | 3 ppb BOHRAMYL in Brine Solutions | | | | | | |
|---|---|---|---|---|---|---|---|---|
| | | Brine | API Rheology | | | | | API Fluid* |
| Solvating | Diluting | Solution | One Hr. @ R.T. | | | 16 Hrs. @ 150° F. | | Loss |
| Agent | Agent | (ppg) | 600 | 300 | 3 | 600 | 300 | 3 | (ml) |
| NONE | NONE | 11.6 | 32 | 17 | 2 | 36 | 19 | 1 | 30 |
| Glycerol | IPA | 11.6 | 37 | 19 | 1 | 47 | 24 | 0.5 | 10.2 |
| Glycerol | Cellosolve | 11.6 | 37 | 19 | 1 | 49 | 26 | 2 | 4.9 |
| NONE | NONE | 14.2 | 30 | 16 | 0.5 | 38 | 19 | 1 | 10.4 |
| Glycerol | IPA | 14.2 | 38 | 20 | 1 | 40 | 21 | 0.5 | 10.0 |
| Glycerol | Cellosolve | 14.2 | 40 | 22 | 2 | 45 | 24 | 2 | 4.6 |
| NONE | NONE | 15.0 | 66 | 33 | 9 | 195 | 105 | 3 | 0.8 |
| Glycerol | IPA | 15.0 | 129 | 65 | 1 | 205 | 111 | 3 | 0.4 |
| Glycerol | Cellosolve | 15.0 | 141 | 75 | 2 | 281 | 151 | 4 | 0.2 |
| NONE | NONE | 15.2 | 87 | 52 | ** | 153 | 80 | 2 | 4.2 |
| Glycerol | IPA | 15.2 | 90 | 45 | 1 | 163 | 84 | 2 | 4.6 |
| Glycerol | Cellosolve | 15.2 | 116 | 60 | 2 | 188 | 97 | 3 | 1.0 |
| NONE | NONE | 15.5 | 19 | 10 | 0.5 | 35 | 18 | 1 | 10.3 |
| Glycerol | IPA | 15.5 | 29 | 15 | 1 | 36 | 18 | 2 | 17.5 |
| Glycerol | Cellosolve | 15.5 | 35 | 19 | 2 | 45 | 24 | 2 | 7.8 |
| NONE | NONE | 16.0 | 21 | 11 | 0.5 | 42 | 21 | 0.5 | 10.0 |
| Glycerol | IPA | 16.0 | 34 | 18 | 1 | 40 | 21 | 1 | 15.3 |
| Glycerol | Cellosolve | 16.0 | 37 | 19 | 2 | 46 | 24 | 2 | 9.6 |
| NONE | NONE | 19.2 | 37 | 19 | 2 | 115 | 63 | 3 | 0.1 |
| Glycerol | IPA | 19.2 | 69 | 34 | 1 | 98 | 52 | 3 | 0.2 |
| Glycerol | Cellosolve | 19.2 | 75 | 41 | 2 | 129 | 70 | 3 | 0.4 |

*10 ppb BARACARB CaCO$_3$ bridging agent added to hot rolled brine
**lumps

EXAMPLE 11

A polymer suspension was prepared by mixing 100 grams of carboxymethyl starch (CMS), 200 grams of ethylene glycol, 50 grams of isopropanol and 5 grams of CAB-O-SIL M5 for 3 minutes on a Multimixer.

A second polymer suspension was prepared by mixing 10 parts by weight of XC polymer, 3 parts by weight of ethylene glycol, and 10 parts by weight of isopropanol containing 1% by weight KLUCEL H TABLE 11-continued

|  | Sample | |
| --- | --- | --- |
|  | 1 | 2 |
| API Filtrate | 35 | 17 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A polymer composition for use in thickening aqueous mediums comprising a particulate, organic polymer selected from the group consisting of cellulose derivatives, starch derivatives, polysaccharide gums, and mixtures thereof which is water dispersible, increases the viscosity or decreases the fluid loss of an aqueous medium, and normally forms agglomerates upon addition to an aqueous medium, a solvating agent comprising a water miscible, polar organic liquid selected from the class consisting of aliphatic glycols containing from 2 to 5 carbon atoms, alkylene triols containing from 3 to 5 carbon atoms, polyalkylene glycols containing 4 to 9 carbon atoms, amides containing from 1 to 4 carbon atoms, and mixtures thereof, which solvating agent when uniformly mixed with said polymer in a weight ratio of polymer to solvating agent of 1:2 produces a mixture with substantially no free liquid solvating agent present after remaining quiescent for one week at ambient temperature in a sealed container, a diluting agent, said diluting agent comprising an organic liquid which is not a solvating agent, wherein the weight ratio of said solvating agent and a compatibilizing agent capable of increasing the viscosity of said diluting agent, to said polymer in said composition is from about 1:1 to about 5:1, and wherein said compatibilizing agent comprises the reaction product of a methyl benzyl dialkyl ammonium compound wherein the ammonium compound contains 20 to 75% alkyl groups having 18 carbon atoms, and a smectite-type clay having cationic exchange capacity of at least 75 milliequivalents per hundred grams of said clay, and wherein the amount of said ammonium compound is from about 100 to 120 milliequivalents per hundred grams of said clay, 100% active clay basis.

2. The composition of claim 1 wherein said solvating agent comprises ethylene glycol.

3. The composition of claim 1 wherein said solvating agent comprises glycerine.

4. The composition of claim 1 wherein said diluting agent is selected from the class consisting of liquid aliphatic and aromatic hydrocarbons containing from 5 to 10 carbon atoms, diesel oil, kerosene, alkanols containing at least 3 carbon atoms, and mixtures thereof.

5. The composition of claim 1 wherein said smectite-type clay is selected from the class consisting of hectorite and sodium bentonite.

6. The composition of claim 1 wherein the methyl benzyl dialkyl ammonium compound is methyl benzyl dihydrogenated tallow ammonium chloride.

7. The composition of claim 1 wherein the weight ratio is from about 2:1 to about 4:1.

8. The composition of claim 1 wherein said polymer is present in an amount of from about 10 to about 25% by weight.

9. The composition of claim 1 wherein said solvating agent is present in an amount of from about 5 to about 88% by weight.

10. The composition of claim 1 wherein said diluting agent is present in an amount of from about 2 to about 70 by weight.

11. The composition of claim 1 wherein said polymer comprises xanthan gum.

12. The composition of claim 1 wherein said polymer comprises carboxymethyl cellulose.

13. The composition of claim 1 wherein said polymer comprises hydroxyethyl starch.

14. The composition of claim 1 wherein said polymer comprises carboxymethyl starch.

15. A well servicing fluid comprising:
an aqueous medium; and
a polymer composition comprising a particulate organic polymer selected from the group consisting of cellulose derivatives, starch derivates, polysaccharide gums, and mixtures thereof which is water dispersible, increases the viscosity or decreases the fluid loss of an aqueous medium, and normally forms agglomerates upon addition to an aqueous medium; a solvating agent comprising a water miscible, polar organic liquid selected from the class consisting of aliphatic glycols containing from 2 to 5 carbon atoms, alkylene triols containing from 3 to 5 carbon atoms, polyalkylene glycols containing 4 to 9 carbon atoms, amides containing from 1 to 4 carbon atoms, and mixtures thereof, which solvating agent when uniformly mixed with said polymer in a weight ratio of polymer to solvating agent of 1:2 produces a mixture with no free liquid solvating agent present after remaining quiescent for one week at ambient temperature in a sealed container; a diluting agent, said diluting agent comprising an organic liquid which is not a solvating agent, and a compatibilizing agent capable of increasing the viscosity of said diluting agent, wherein the weight ratio of said solvating agent to said polymer in said composition is from about 1:1 to about 5:1, the concentration of said diluting agent is sufficient to maintain said composition in a liquid, pourable state at a temperature of about 20° C., and wherein said compatibilizing agent comprises the reaction product of a methyl benzyl dialkyl ammonium compound wherein the ammonium compound contains 20 to 75% alkyl groups having 18 carbon atoms, and a smectite-type clay having cationic exchange capacity of at least 75 milliequivalents per hundred grams of said clay, and wherein the amount of said ammonium compound is from about 100 to 120 milliequivalents per hundred grams of said clay, 100% active clay basis.

16. The composition of claim 15 wherein said aqueous medium comprises a solution of at least one water soluble salt of a multivalent metal ion.

17. The composition of claim 15 wherein said aqueous medium has a density greater than about 11.0 pounds per gallon.

18. The composition of claim 16 wherein said water soluble salt is selected from the group consisting of calcium chloride, calcium bromide, zinc chloride, zinc bromide, and mixtures thereof.

19. The composition of claim 17 wherein the density of said aqueous medium is from about 12.0 pounds per gallon to about 19.2 pounds per gallon.

20. The composition of claim 19 wherein said polymer comprises xanthan gum.

21. The composition of claim 19 wherein said polymer comprises carboxymethyl cellulose.

22. The composition of claim 19 wherein said polymer comprises hydroxyethyl starch.

23. The composition of claim 19 wherein said polymer comprises carboxymethyl starch.

* * * * *

UNITED STATES PATENT AND TRADEMARK OFFICE
CERTIFICATE OF CORRECTION

PATENT NO. : 4,427,556
DATED : January 24, 1984
INVENTOR(S) : Roy F. House; Lonnie D. Hoover It is certified that error appears in the above—identified patent and that said Letters Patent is hereby corrected as shown below:

In Column 4, line 11, delete "25%" and insert therefor --35%--.

In Column 15, bridging lines 38-39, delete "wherein the weight ratio of said solvating agent".

In Column 15, line 40, after "agent," insert --wherein the weight ratio of said solvating agent--.

In Column 15, line 45, after "to" insert --35% alkyl groups having 16 carbon atoms and 60 to--.

In Column 16, line 52, after "to" insert --35% alkyl groups having 16 carbon atoms and 60 to--.

Signed and Sealed this

Twentieth Day of January, 1987

Attest:

DONALD J. QUIGG

Attesting Officer     Commissioner of Patents and Trademarks